United States Patent
Tao et al.

(10) Patent No.: US 11,560,159 B2
(45) Date of Patent: Jan. 24, 2023

(54) GROUP AND COMBINE OBSTACLES FOR AUTONOMOUS DRIVING VEHICLES

(71) Applicant: Baidu USA LLC, Sunnyvale, CA (US)

(72) Inventors: Jiaming Tao, Sunnyvale, CA (US); Qi Luo, Sunnyvale, CA (US); Jinyun Zhou, Sunnyvale, CA (US); Kecheng Xu, Sunnyvale, CA (US); Yu Wang, Sunnyvale, CA (US); Shu Jiang, Sunnyvale, CA (US); Jiangtao Hu, Sunnyvale, CA (US); Jinghao Miao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 269 days.

(21) Appl. No.: 16/830,090

(22) Filed: Mar. 25, 2020

(65) Prior Publication Data

US 2021/0300427 A1    Sep. 30, 2021

(51) Int. Cl.
| | |
|---|---|
| *B60W 60/00* | (2020.01) |
| *G05D 1/00* | (2006.01) |
| *G05D 1/02* | (2020.01) |
| *B60W 30/09* | (2012.01) |

(52) U.S. Cl.
CPC ........ *B60W 60/0027* (2020.02); *B60W 30/09* (2013.01); *B60W 60/0015* (2020.02); *G05D 1/0088* (2013.01); *G05D 1/0214* (2013.01); *B60W 2554/4029* (2020.02); *B60W 2554/4044* (2020.02); *B60W 2554/801* (2020.02); *G05D 2201/0213* (2013.01)

(58) Field of Classification Search
None
See application file for complete search history.

(56) References Cited

U.S. PATENT DOCUMENTS

| | | | |
|---|---|---|---|
| 9,248,834 B1 * | 2/2016 | Ferguson | B60W 60/0027 |
| 10,489,686 B2 * | 11/2019 | Vallespi-Gonzalez | |
| | | | G06V 20/58 |
| 2019/0129432 A1 * | 5/2019 | Russell | G01C 21/3415 |
| 2020/0401135 A1 * | 12/2020 | Chen | G05D 1/0088 |

* cited by examiner

*Primary Examiner* — Tamara L Weber
(74) *Attorney, Agent, or Firm* — Womble Bond Dickinson (US) LLP (57) ABSTRACT

In one embodiment, a plurality of obstacles is sensed in an environment of an automated driving vehicle (ADV). One or more representations are formed to represent corresponding groupings of the plurality of obstacles. A vehicle route is determined in view of the one or more representations, rather than each and every one of the obstacles individually.

20 Claims, 9 Drawing Sheets

401 — SENSING A PLURALITY OF MOVING OBSTACLES IN AN ENVIRONMENT OF AN AUTOMATED DRIVING VEHICLE (ADV)

402 — FORMING A SINGLE REPRESENTATION OF THE PLURALITY OF MOVING OBSTACLES

403 — DETERMINING A VEHICLE ROUTE IN VIEW OF THE SINGLE REPRESENTATION OF THE PLURALITY OF OBSTACLES, WHEREIN CONTROL COMMANDS ARE GENERATED TO EFFECT MOVEMENT OF THE ADV ALONG THE VEHICLE ROUTE

GROUP AND COMBINE OBSTACLES FOR AUTONOMOUS DRIVING VEHICLES

TECHNICAL FIELD

Embodiments of the present disclosure relate generally to operating autonomous vehicles. More particularly, embodiments of the disclosure relate to reduction of obstacles for planning and routing an autonomous driving vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Navigating an autonomous driving vehicle (ADV) can be performed by generating a path that the ADV will follow, and then producing a series of control commands (e.g., throttle, steering, braking) to effect movement of the ADV along the path. Generation of the path can be performed in view of obstacles sensed in an environment of the ADV.

Autonomous driving vehicles treat each obstacle individually in generating the ADV path. Each obstacle adds to the ADV's computational load because the ADV must account for each obstacle in different algorithms. In some cases, an obstacle may be split into multiple obstacles, which can further increase computational load.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

As recognized in the present disclosure, quantity of obstacles can increase computational load and hurt performance of the ADV dramatically because each obstacle is computed and processed in every computational task and algorithms associated therewith. These computational tasks and algorithms can include rules, path deciders, speed deciders, path optimizers, speed optimizers, etc. Therefore, it is recognized that reduction of obstacles can drastically improve computational efficiency and reduce load.

According to some embodiments, an autonomous driving vehicle (ADV) can sense a plurality of obstacles. These obstacles can be reduced through grouping and combining, to form a single representation of the plurality of obstacles. A vehicle route is determined in view of the single representation, thereby treating the multiple obstacles as a single obstacle and reducing computational load as a result. In some cases, depending on one or more conditions (e.g., proximity, direction, type), some obstacles are grouped and represented by one representation, and other obstacles are grouped separately and represented by a different representation.

Figure 1:
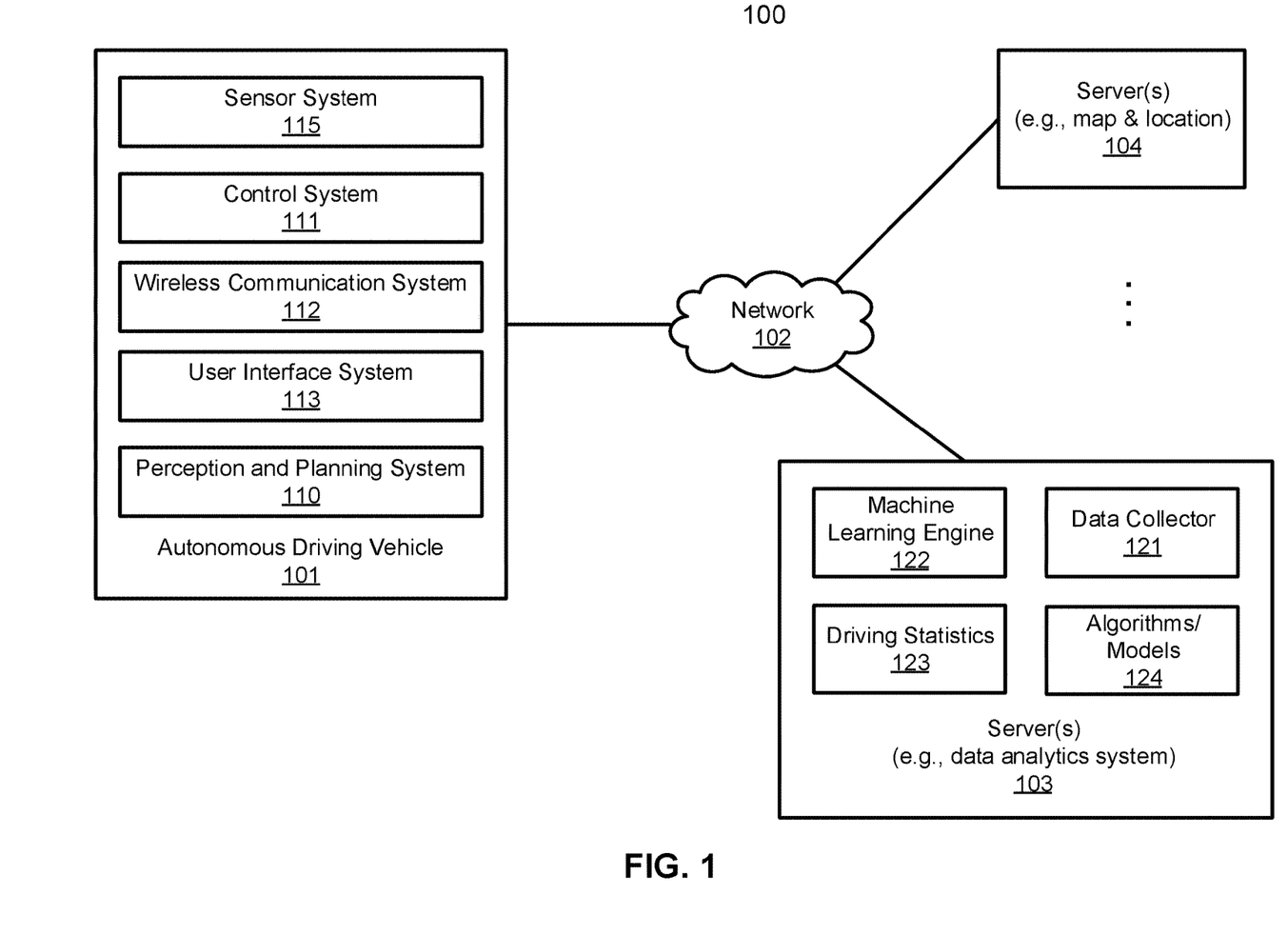
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
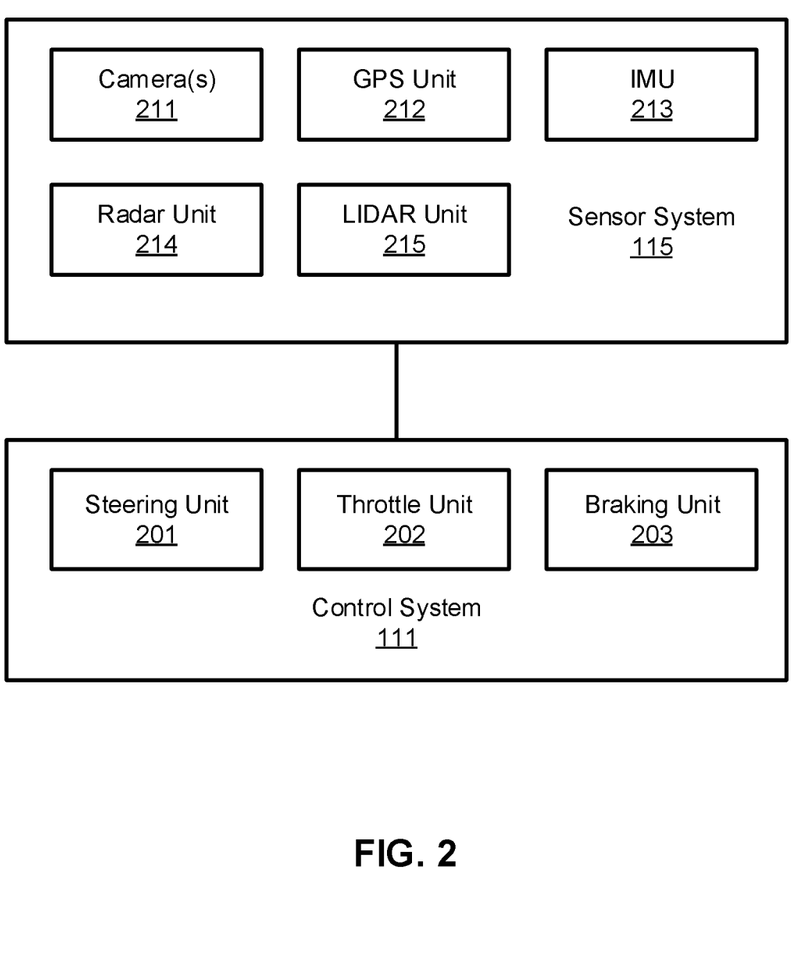
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using Wi-Fi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

The wireless communication system 112 can include a vehicle-to-everything (V2X) communication unit. The communication unit communicates over a wireless communication protocol (e.g., cellular V2X (C-V2X). The communication unit can communicate with other vehicles and devices (V2V or V2I) such as roadside devices or servers, and with a V2X network. The ADV can receive, through the V2X unit, data regarding objects, obstacles (e.g., other vehicles, pedestrians, debris, etc.), road information, and/or map information. This data can be processed by perception and planning system 110, in addition or alternative to the sensor data generated by the ADV's onboard sensors, to assess and perceive the environment around the ADV.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. For example, algorithms 124 may include an algorithm for grouping obstacles during the perception process. Algorithms 124 can then be uploaded on ADVs to be utilized during autonomous driving in real-time.

Figure 3A:
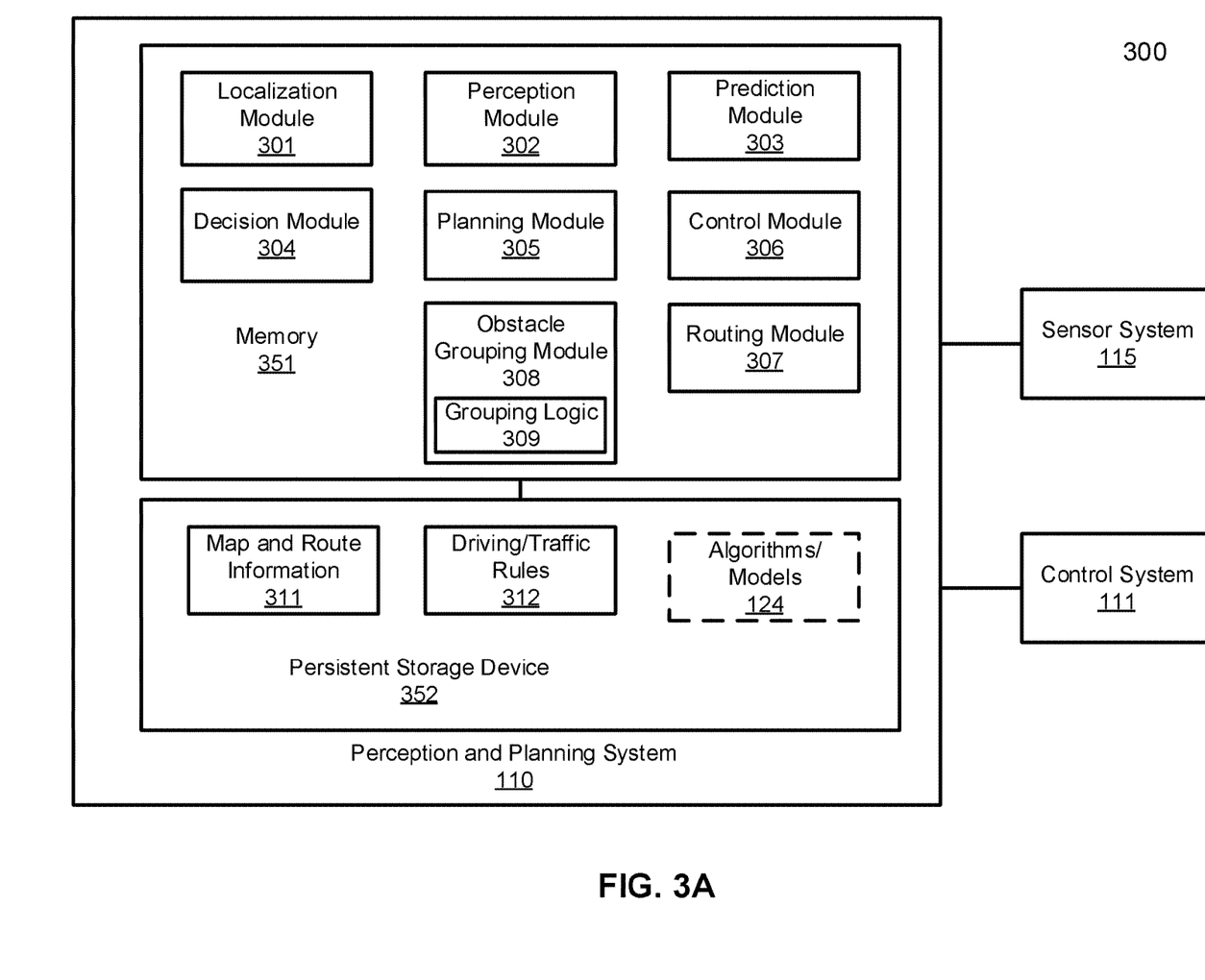
FIGS. 3A-3B are block diagrams illustrating an example of a perception and planning system used with an autonomous vehicle according to one embodiment.
Figure 3B:
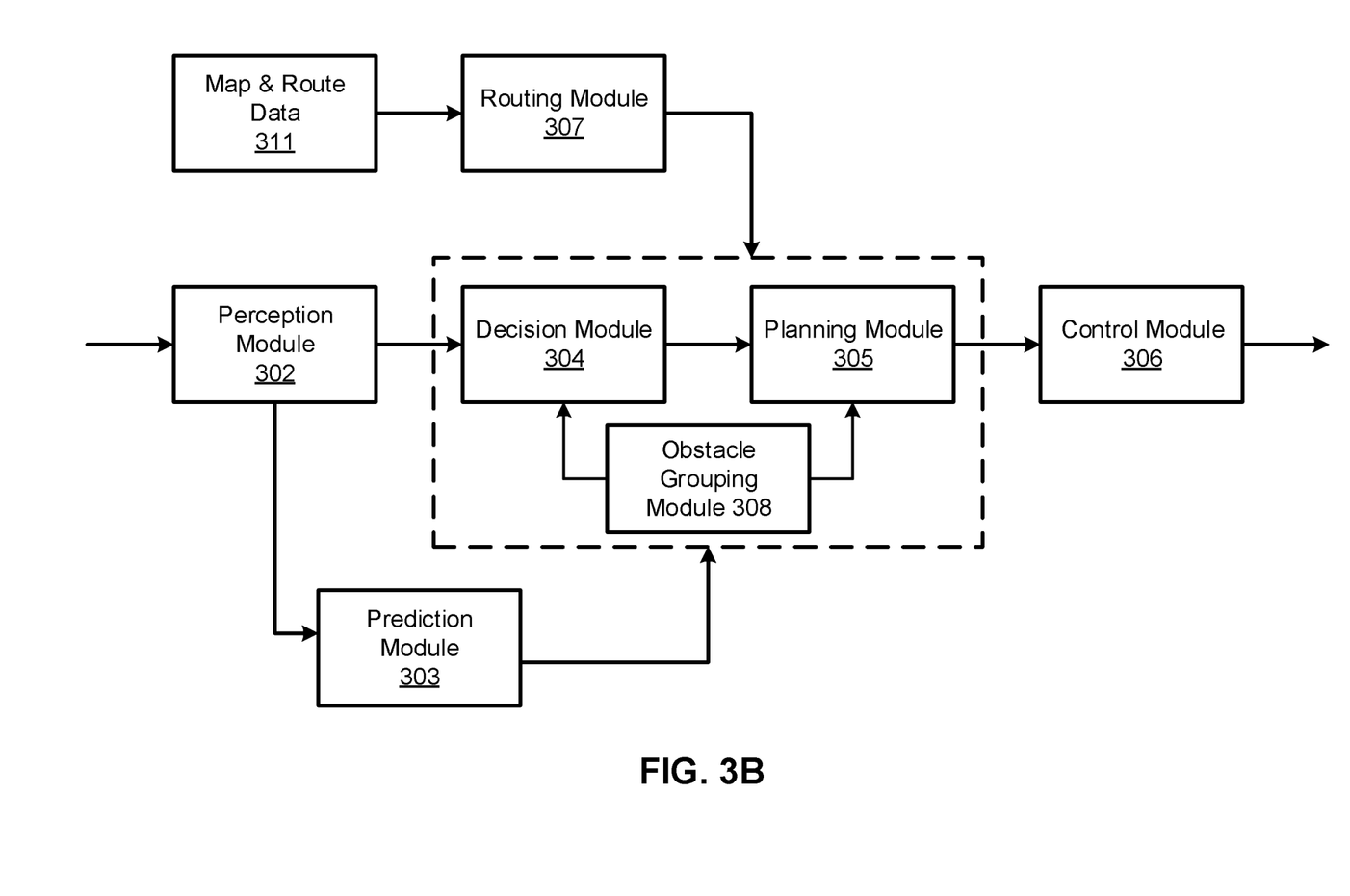

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and obstacle grouping module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, and obstacles (e.g., other vehicles, pedestrians, cyclists, etc.). The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

According to one embodiment, localization module 301 and/or perception module 302 may communicate with other devices such as roadside devices to determine the localization of the vehicle and to perceive a driving environment surrounding the vehicle, in conjunction with the sensor data obtained via the on-board sensors. For example, certain roadside devices disposed along the road may be equipped with sensors, such as, cameras, LIDAR devices, and/or RADAR devices. The roadside devices can include functionality similar to perception module 302 to determine the driving environment of certain road or lane segments, including recognizing the obstacles, traffic lights, etc. Such information can be communicated to the vehicles nearby, for example, via a V2X link. A vehicle can utilize the information received from the roadside devices to perceive the driving environment. Alternatively, the vehicle can combine its own perception process with the perception data received from the roadside devices in perceiving the driving environment.

For each of the obstacles, prediction module 303 predicts how the object (which can be an obstacle) will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object (which can be an obstacle). For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects (e.g., each obstacle) perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Obstacle grouping module 308 can group sensed obstacles in the ADV environment into one or more groups. Sensing and identifying of the obstacles can be performed through sensor system 115 and perception module 302. Sensing and/or identification data can also be received over wireless communication system 112 (e.g., through V2X). For example, roadside sensors (e.g., using LIDAR, cameras, etc.) can sense and/or identify obstacles and communicate this information to the ADV. Further, each predicted path of obstacles can also be treated as a separate obstacle. These predicted paths can be generated by prediction module 303. Obstacle grouping module 308 may be implemented as a part of planning module 305 and/or control module 306.

A single representation can be formed for each of the groups. Decision module 304 can make decisions, as described in preceding sections, based on the single representation (or representations) instead of treating each obstacle separately, thereby reducing computational load. Similarly, planning module 305 can then plan the route, as described in preceding sections, but based on the single representation rather than treating the multiple obstacles as separate.

Figure 5:
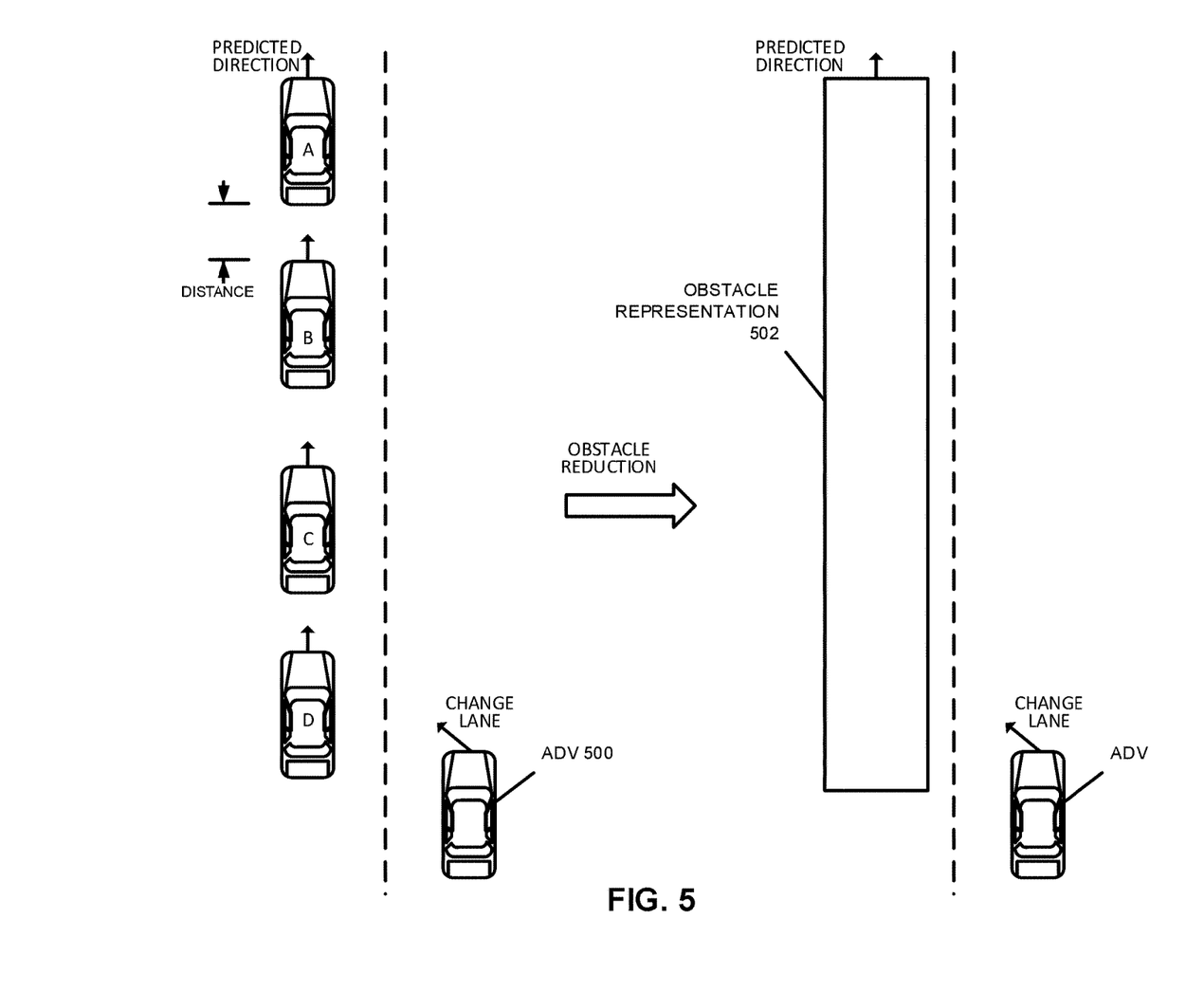
FIG. 5 shows an example of grouping and combining vehicle obstacles according to one embodiment.

The obstacle grouping module can have grouping logic 309 that groups the obstacles into separate groups based on one or more conditions. For example, the grouping logic 309 can group the plurality of obstacles based on distance between each of the plurality of obstacles. Obstacles that fall within a threshold distance to one another will be represented by the same obstacle representation. When two obstacles are within a threshold distance, they can be linked by distance. This distance can be calculated 'longitudinally', or along the direction of movement of the obstacles. These links can form a chain of two or more obstacles and so long as each link of the chain is within the threshold distance, all linked obstacles can be represented by the same obstacle. An example is shown in FIG. 5, even though obstacle A and D might not be located within threshold proximity to one another, they are linked through the obstacles between them, so that all four obstacles can be represented by the obstacle representation. This example is further discussed in other sections.

In some embodiments, grouping logic can group the plurality of obstacles based on a) distance between each of the plurality of obstacles, and/or b) commonality of movement direction of the plurality of obstacles. For example, grouping logic can require that the obstacles are linked together by a threshold distance, and/or that they are moving in a similar predicted direction. If obstacles are predicted to be moving in different direction, then grouping them in the same representation can inaccurately reflect the reality of the ADV environment and cause problems. To simplify, the threshold distance can be measured as a longitudinal distance or space between obstacles, this distance being along a shared direction and path of the obstacles. Again referring to FIG. 5, obstacles A-D are moving along the same driving lane, thus the distance between each of the obstacles is a longitudinal distance or space.

In some embodiments, grouping the plurality of obstacles is based on a) distance between each of the plurality of obstacles, b) commonality of movement direction of the plurality of obstacles, and/or c) commonality of type of the obstacle. For example, vehicles can be grouped only with other vehicles, and pedestrians can be grouped only with other pedestrians. This leverages the assumption that vehicles will behave similarly (e.g., according to the same road rules), while pedestrians will behave like other pedestrians, to rules different from the vehicles.

Additional or alternative to the conditions already described, grouping logic can also group the plurality of obstacles based on commonality of a) speed (e.g., within a threshold speed from one another), and/or b) predicted path of the obstacles. Each of these conditions can be satisfied when a corresponding threshold is exceeded (e.g., speed threshold, distance threshold, direction threshold, etc.) These thresholds can vary based on application and can be determined through routine test and experimentation. For example, speed thresholds can be 2, 5, 10, or 20 mph. Distance thresholds can be 1, 2, 5, or 10 meters. Further, such thresholds can be functions of each other, for example, the distance thresholds can be greater for vehicles than for pedestrians, due to higher potential speed of vehicles. Other conditions can be implemented to group and combine the obstacles without departing from the scope of the present disclosure.

Figure 4:
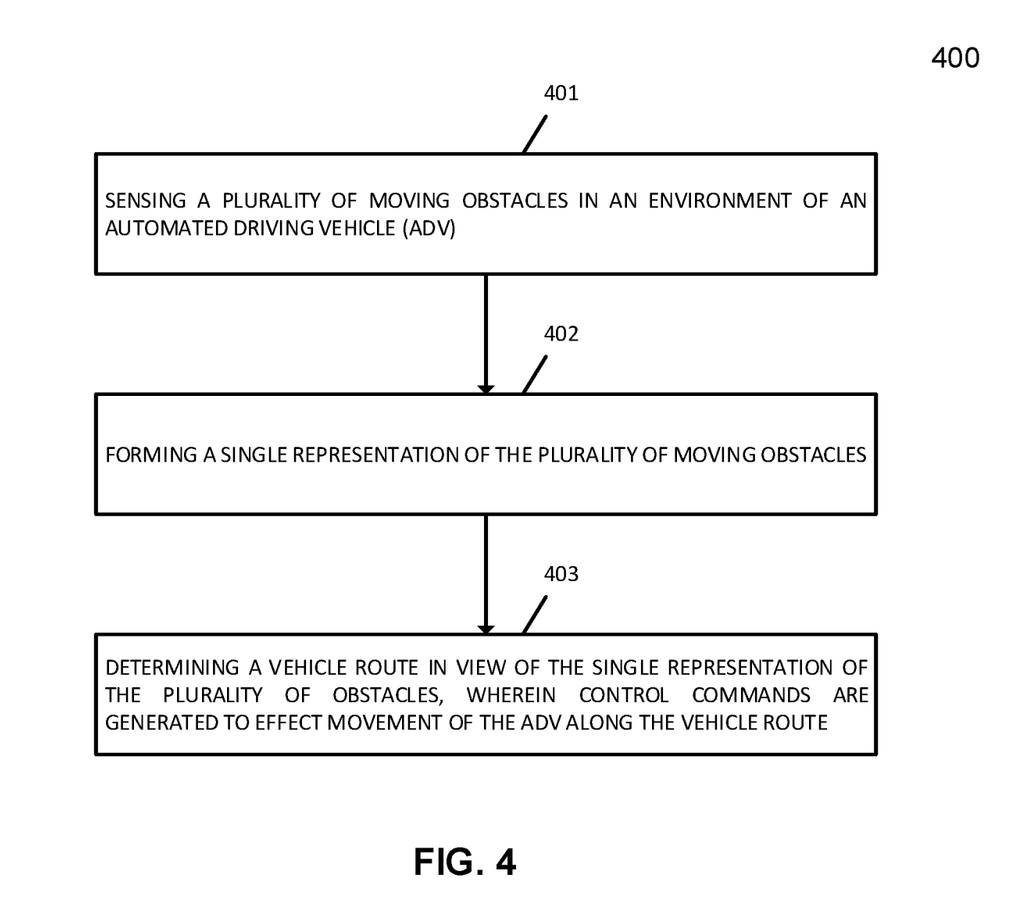
FIG. 4 shows a method for reducing number of obstacles for planning autonomous driving according to one embodiment.

Referring now to FIG. 400, a method is shown for determining a vehicle route of an ADV with reduced number of obstacles. The method can be performed by perception and planning system 110, including, for example, the obstacle grouping module 308 and grouping logic 309.

At operation 401, the method includes sensing a plurality of obstacles in an environment of an automated driving vehicle. The environment of the ADV can include the sensed environment of the ADV (e.g., determined by sensor system 115) and can include a perimeter around the ADV that is capable of being reliably sensed, e.g., 5, 10, 20, 30, or 50 meters.

At operation 402, the method includes forming a single representation of the plurality of obstacles sensed at the previous operation. This operation can include grouping the plurality of obstacles based on the one or more conditions such as commonality in obstacle type, distance, speed, predicted path, driving lane, and/or direction, as described in other sections.

The grouping conditions, such as obstacle types (e.g., pedestrians, vehicles, cyclists, etc.) and distances can be determined by processing sensed data (e.g., images produced by one or more cameras) with computer vision or other equivalent techniques. Computer vision can include implementation of object recognition, edge detection, trained neural networks, and more.

At operation 403, the method includes determining a vehicle route in view of the single representation of the plurality of obstacles. Control commands (e.g., throttle, brake, and steering) can be generated to effect movement of the ADV along the vehicle route. Determining the vehicle route in view of the single representation of the plurality of obstacles can include a) determining a driving decision, including at least one of a yield decision, an overtake decision, a pass decision, and a stop decision, based on the single representation of the plurality of obstacles, and/or b) optimizing the vehicle route based on the single representation of the plurality of obstacles and the driving decision. In other words, the driving decision can be made to overtake, pass, stop in front of, or yield to, the single representation, instead of each obstacle individually. The vehicle route can be optimized based on the decision, while treating the grouped obstacles as a single obstacle representation (e.g., having a single size, a single direction, a single predicted path, a single speed, and/or a single position).

It should be understood that a single (e.g., a first) representation is formed for one group of obstacles, but additional representations (e.g., a second and/or third representation) can be formed for other grouped obstacles. Further, the ADV can group some obstacles while leaving other obstacles alone, if those obstacles do not satisfy the conditions.

In some embodiments, this method is performed only for moving obstacles. Moving obstacles can increase computational load more than static obstacles, due to multiple trajectories and inherent unpredictability of moving obstacles such as other vehicles, pedestrians, cyclists, etc. In some embodiments, this is performed for both moving and static obstacles.

In some embodiments, method 400 is performed periodically. For example, the method can be performed for every driving cycle, or at intervals greater than every driving cycle.

FIG. 5 shows an example of grouping, combining, and reducing obstacles. In some embodiments, forming the single representation of the plurality of obstacles is performed in response to when the plurality of obstacles are vehicles that are driving along a same driving lane within a threshold distance to each other. As discussed, this condition can also be calculated as a longitudinal distance that describes a length along a shared path of the obstacles.

In FIG. 5, obstacles 700 are driving along a left vehicle lane. The ADV 500, in this example, is driving on a right driving lane but wishes to change lanes to the left vehicle lane. If obstacles 501 satisfy one or more conditions (e.g., driving along the same driving lane within a threshold distance of each other), then the ADV can form obstacle representation 502 to represent obstacles 501. In this manner, obstacles 501 are treated as a single obstacle when determining the ADV's route, thereby increasing efficiency of the ADV, and allocating resources for other tasks.

Obstacles can be linked when the threshold distance between them is satisfied. All obstacles directly or indirectly linked can then be represented by the same obstacle representation. In this example, obstacle A is linked to obstacle B, obstacle B is linked to obstacle C, and obstacle C is linked to obstacle D. All obstacles A-D are thus linked directly or indirectly and represented by obstacle representation 502. Although not required, the obstacle representation can have a size, shape, and location that covers an area of the obstacles that are represented.

Figure 6:
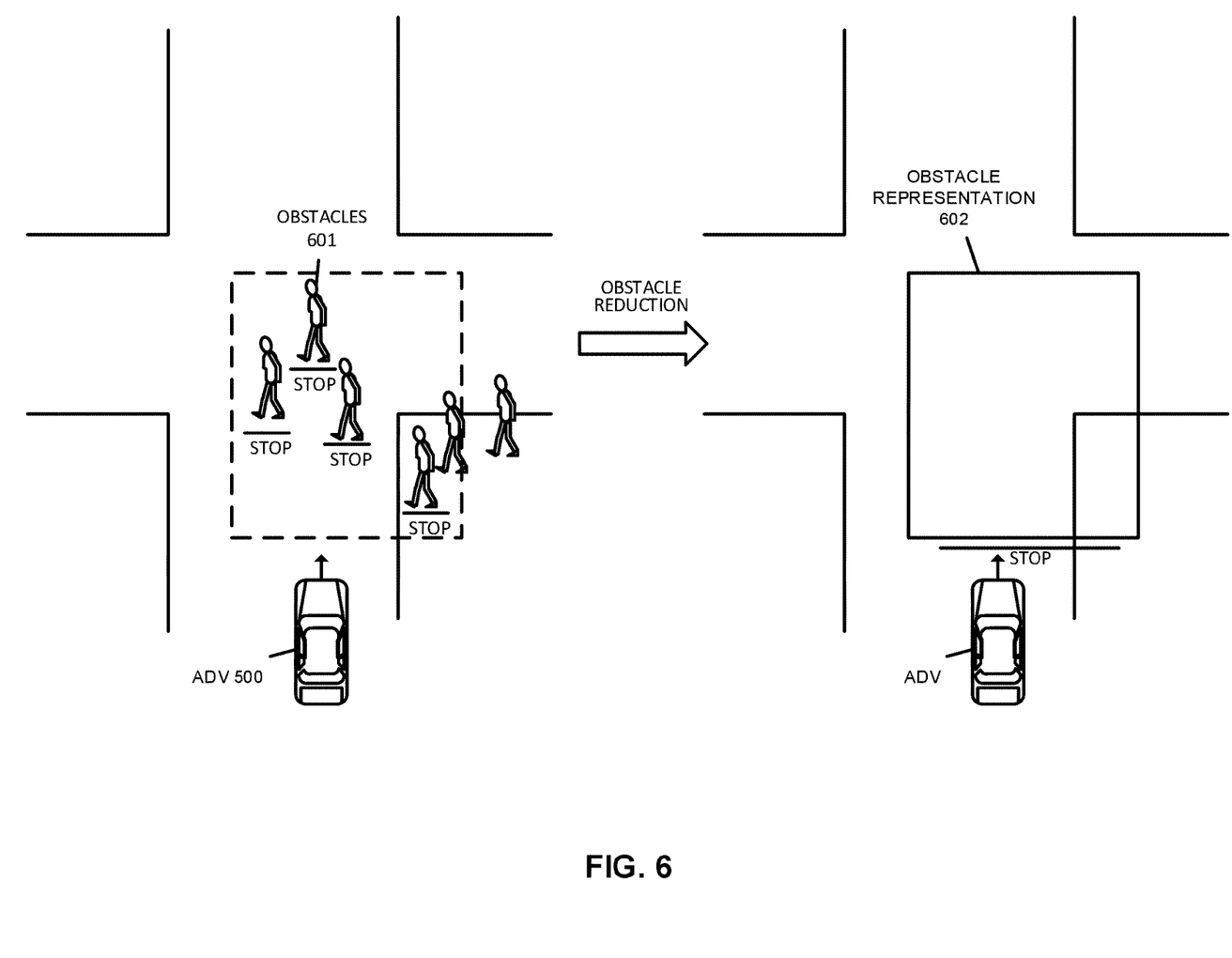
FIG. 6 shows an example of grouping and combining pedestrian obstacles according to one embodiment.

FIG. 6 shows another example of reducing obstacles through grouping. In this example, obstacles 601 are pedestrians. Obstacle representation 602 of the plurality of obstacles 601 is formed in response to when the plurality of obstacles are pedestrians within a threshold distance to each other. Rather than treating each pedestrian individually and generating a 'stop fence' which acts as a virtual wall in front of each pedestrian, the method can generate the route of the ADV based on the single obstacle representation 602 with a single virtual wall. The ADV can make a single stop decision based on the single virtual wall of the obstacle representation, this single decision accounting for all the pedestrians.

Figure 7:
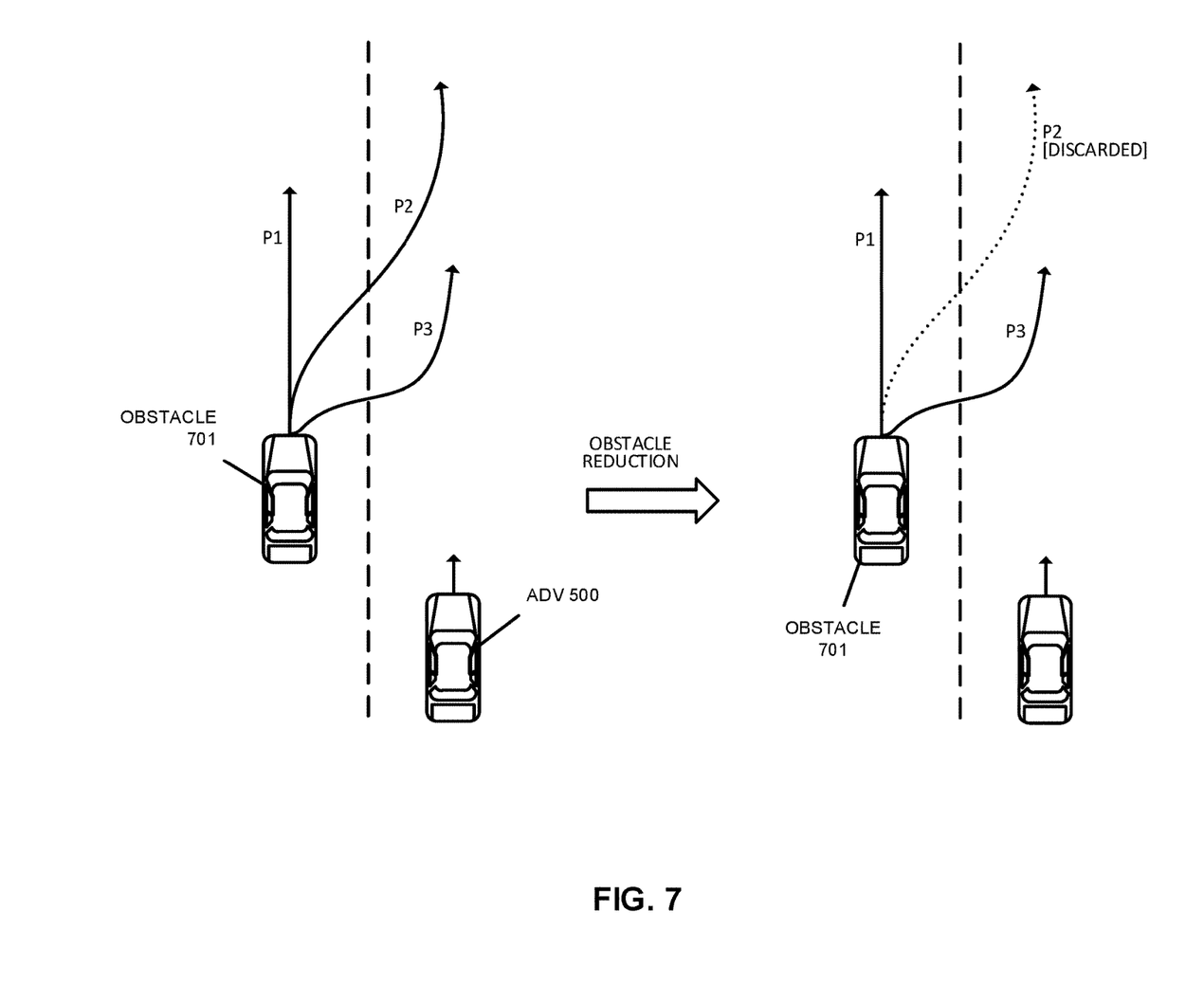
FIG. 7 shows an example of reducing obstacles with a plurality of predicted paths according to one embodiment.

In some embodiments, in addition to other discussed features, the ADV can predict a plurality of potential paths for one or more obstacles. Each of these predicted paths can potentially be an obstacle to the ADV. Some of these predicted paths can be discarded, to further reduce overhead. FIG. 7 shows an example of such a feature.

In FIG. 7, an obstacle 701 is shown as a vehicle driving in a left lane. The ADV 500 can predict potential obstacle paths P1, P2, and P3 of the obstacle. Rather than generating a vehicle route with consideration of each and every predicted obstacle path (P1, P2, and P3), the ADV can discard one or more of the predicted paths, thereby reducing the number of obstacles to consider in tasks and algorithms. The ADV can determine the vehicle route based on some of the predicted paths (e.g., P1 and P3), but ignore P2. A path can be ignored when another of the plurality of potential paths is between the ADV and the at least one one of the plurality of potential paths that is being ignored. In this example, P2 is ignored because P3 is between the ADV and P2. Thus, by accounting for P3 in the vehicle route determination, the ADV need not also account for P2, because P2 is behind P3 (relative to the ADV). In other words, driving decision and optimization performed in view of P3 will account for P2, making additional consideration of P2 redundant.

Figure 8:
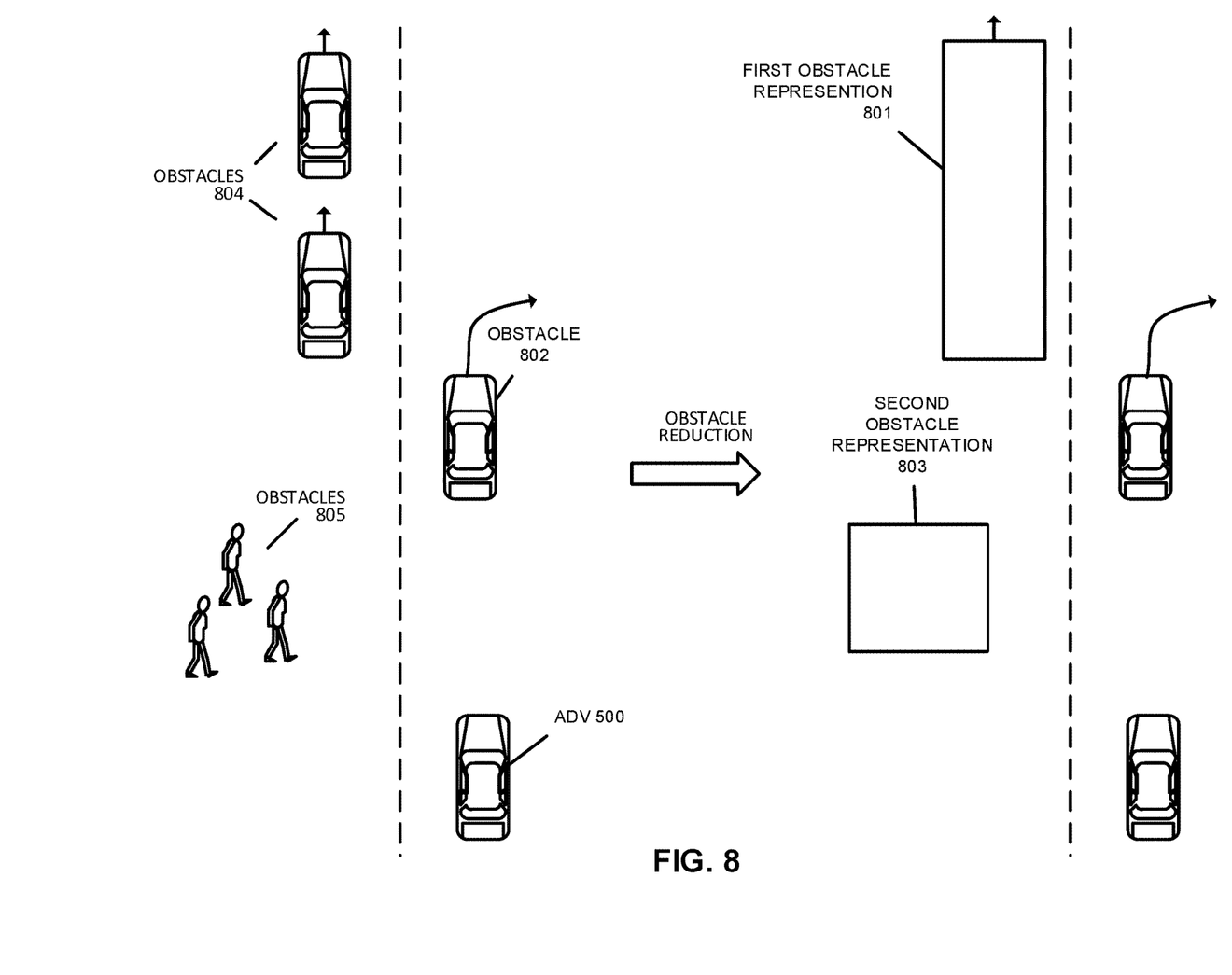
FIG. 8 shows an example with multiple representations of combined obstacles according to one embodiment.

FIG. 8 shows multiple obstacle representations of different combined obstacles. In this example, ADV 500 senses obstacles 804 in a left lane, obstacle 802 in the same lane as the ADV, and obstacles 805 that are walking in the ADV's sensed environment. The ADV can generate a first obstacle representation 801 that represents obstacles 804. The ADV can generate a second obstacle representation 803 that represents obstacles 805. These obstacles can be grouped into respective groups based on the conditions described, such as but not limited to position, distance, type, speed, lane, and/or direction. For example, obstacles 805 are pedestrians while obstacles 804 are vehicles. Further, obstacle 802 is not in the same lane as obstacles 804, does not satisfy distance threshold, and/or the predicted path is dissimilar from that of obstacles 804. The ADV, in this example, can determine the vehicle route in view of first obstacle representation 801, second obstacle representation 803, and obstacle 802. While all the sensed obstacles have not been reduced to a single representation, the number of obstacles is substantially reduced nonetheless. The ADV can reduce the number of obstacles in a flexible manner, not requiring a one-size fits all approach.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method for operating an autonomous driving vehicle, the method comprising:
sensing a plurality of obstacles in an environment of an automated driving vehicle (ADV);

forming a single representation of the plurality of obstacles based on a set of one or more rules in view of relative relationships amongst the obstacles;
predicting a plurality of potential paths of one of the plurality of obstacles;
discarding a first of the plurality of potential paths, in response to a second of the plurality of potential paths being between the ADV and the first of the plurality of potential paths;
determining a vehicle route in view of the single representation of the plurality of obstacles and the plurality of potential paths which does not include the first of the plurality of potential paths; and
generating one or more control commands to effect movement of the ADV along the vehicle route.

2. The method of claim 1, wherein the set of one or more rules includes whether the plurality of obstacles are vehicles that are driving along a same driving lane within a threshold distance to each other.

3. The method of claim 1, wherein the set of one or more rules includes whether the plurality of obstacles are pedestrians within a threshold distance to each other.

4. The method of claim 3, further comprising generating a single virtual wall for the single representation of the pedestrians.

5. The method of claim 1, wherein the set of one or more rules includes distance between each of the plurality of obstacles.

6. The method of claim 1, wherein the set of one or more rules includes at least one of a) distance between each of the plurality of obstacles, or b) commonality of movement direction of the plurality of obstacles.

7. The method of claim 1, wherein the set of one or more rules includes at least one of a) distance between each of the plurality of obstacles, b) commonality of movement direction of the plurality of obstacles, or c) commonality of type of the obstacle.

8. The method of claim 1, further comprising:
sensing a different plurality of obstacles in the environment of the ADV; and
forming a second representation of the different plurality of obstacles; wherein
the second representation of the different plurality of obstacles is also used to determine the vehicle route.

9. The method of claim 1, wherein determining a vehicle route in view of the single representation of the plurality of obstacles includes:
determining a driving decision, including at least one of a yield decision, an overtake decision, a pass decision, and a stop decision, based on the single representation of the plurality of obstacles; and
optimizing the vehicle route based on the single representation of the plurality of obstacles and the driving decision.

10. A non-transitory machine-readable medium having instructions stored therein, which when executed by a processor, cause the processor to perform operations, the operations comprising:
sensing a plurality of obstacles in an environment of an automated driving vehicle (ADV);
forming a single representation of the plurality of obstacles based on a set of one or more rules in view of relative relationships amongst the obstacles;
predicting a plurality of potential paths of one of the plurality of obstacles;
discarding a first of the plurality of potential paths, in response to a second of the plurality of potential paths being between the ADV and the first of the plurality of potential paths;
determining a vehicle route in view of the single representation of the plurality of obstacles and the plurality of potential paths which does not include the first of the plurality of potential paths; and
generating one or more control commands to effect movement of the ADV along the vehicle route.

11. The non-transitory machine-readable medium of claim 10, wherein the set of one or more rules includes whether the plurality of obstacles are vehicles that are driving along a same driving lane within a threshold distance to each other.

12. The non-transitory machine-readable medium of claim 10, wherein the set of one or more rules includes whether the plurality of obstacles are pedestrians within a threshold distance to each other.

13. The non-transitory machine-readable medium of claim 12, wherein the operations further comprise generating a single virtual wall for the single representation of the pedestrians.

14. The non-transitory machine-readable medium of claim 10, wherein the set of one or more rules includes distance between each of the plurality of obstacles.

15. The non-transitory machine-readable medium of claim 10, wherein the set of one or more rules includes at least one of a) distance between each of the plurality of obstacles, or b) commonality of movement direction of the plurality of obstacles.

16. A data processing system, comprising:
a processor; and
a memory coupled to the processor to store instructions, which when executed by the processor, cause the processor to perform operations, the operations including;
sensing a plurality of obstacles in an environment of an automated driving vehicle (ADV);
forming a single representation of the plurality of obstacles based on a set of one or more rules in view of relative relationships amongst the obstacles;
predicting a plurality of potential paths of one of the plurality of obstacles;
discarding a first of the plurality of potential paths, in response to a second of the plurality of potential paths being between the ADV and the first of the plurality of potential paths;
determining a vehicle route in view of the single representation of the plurality of obstacles and the plurality of potential paths and not the first of the plurality of potential paths; and
generating one or more control commands to effect movement of the ADV along the vehicle route.

17. The data processing system of claim 16, wherein the set of one or more rules includes whether the plurality of obstacles are vehicles that are driving along a same driving lane within a threshold distance to each other.

18. The data processing system of claim 16, wherein the set of one or more rules includes whether the plurality of obstacles are pedestrians within a threshold distance to each other.

19. The data processing system of claim 18, wherein the operations further comprise generating a single virtual wall for the single representation of the pedestrians.

20. The data processing system of claim 16, wherein the set of one or more rules includes distance between each of the plurality of obstacles.

\* \* \* \* \*